United States Patent
Jacques et al.

(10) Patent No.: US 8,468,995 B2
(45) Date of Patent: Jun. 25, 2013

(54) COMPACT SECOND ORDER BALANCE SHAFT ARRANGEMENT WITH LOW INERTIA DRIVEN SHAFT

(75) Inventors: Robert Lionel Jacques, Troy, MI (US); Cynthia Ann Stuvel, Leonard, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/841,246

(22) Filed: Jul. 22, 2010

(65) Prior Publication Data

US 2011/0277720 A1 Nov. 17, 2011

Related U.S. Application Data

(60) Provisional application No. 61/345,359, filed on May 17, 2010.

(51) Int. Cl.
*F02B 75/06* (2006.01)
(52) U.S. Cl.
USPC .......................... 123/192.2; 74/603
(58) Field of Classification Search
USPC .......................... 123/192.2; 74/603
See application file for complete search history.

(56) References Cited

U.S. PATENT DOCUMENTS

| | | | |
|---|---|---|---|
| 2,914,964 A * | 12/1959 | Wolf-Dieter Bensinger et al. | ............................. 74/604 |
| 5,535,643 A | 7/1996 | Garza | |
| 5,791,309 A | 8/1998 | Yamazaki et al. | |
| 5,918,573 A | 7/1999 | Killion | |
| 6,189,499 B1 | 2/2001 | Iwata et al. | |
| 6,205,970 B1 | 3/2001 | Iwata et al. | |
| 6,601,557 B1 | 8/2003 | Hayman et al. | |
| 7,037,088 B2 | 5/2006 | Shulver et al. | |

* cited by examiner

*Primary Examiner* — Noah Kamen
(74) *Attorney, Agent, or Firm* — Quinn Law Group, PLLC

(57) ABSTRACT

A balancer assembly for an engine includes a first balance shaft and a second balance shaft parallel with and laterally spaced from the first balance shaft. The first balance shaft includes a first counterweight portion and a second counterweight portion axially spaced from each other, with each defining a first radius. The second balance shaft includes a central counterweight defining a second radius. The central counterweight is axially disposed between the first counterweight portion and the second counterweight portion to allow a radial overlap with the first counterweight portion and the second counterweight portion, with the first radius being greater than the second radius.

18 Claims, 5 Drawing Sheets

US 8,468,995 B2

COMPACT SECOND ORDER BALANCE SHAFT ARRANGEMENT WITH LOW INERTIA DRIVEN SHAFT

CROSS-REFERENCE TO RELATED APPLICATIONS

This application claims the benefit of U.S. Provisional Patent Application Ser. No. 61/345,359, filed on May 17, 2010, the disclosure of which is hereby incorporated by reference.

TECHNICAL FIELD

The invention generally relates to an engine, and more specifically to a balancer assembly for the engine.

BACKGROUND

Internal combustion engines, and particularly four stroke four cylinder in-line engines, produce a secondary unbalance during normal operation. A balancer assembly may be incorporated into the engine to generate a vertical shaking force that offsets the secondary unbalance of the engine.

The balancer assembly may include a pair of parallel and laterally offset balance shafts, i.e., a first balance shaft and a second balance shaft, rotatably supported by a housing. The first balance shaft includes a drive gear coupled to and driven by a crankshaft of the engine. The second balance shaft includes a driven gear in meshing engagement with the drive gear. The first balance shaft and the second balance shaft rotate in opposite directions at twice the crankshaft speed to generate the vertical shaking force.

SUMMARY

An engine is provided. The engine includes a block, and a crankshaft rotatably supported by the block. The engine further includes a balancer assembly attached to the block. The balancer assembly is configured for balancing vibration. The balancer assembly includes a housing. A first balance shaft is rotatably supported by the housing for rotation about a first longitudinal axis. The first balance shaft is coupled to and driven by the crankshaft, and includes a drive gear. A second balance shaft is rotatably supported by the housing for rotation about a second longitudinal axis. The second balance shaft includes a driven gear in meshing engagement with the drive gear. The first balance shaft includes a first counterweight portion and a second counterweight portion axially spaced from the first counterweight portion along the first longitudinal axis. The second balance shaft includes a central counterweight disposed axially between the first counterweight portion and the second counterweight portion relative to the first longitudinal axis.

A balancer assembly for an engine is also provided. The balancer assembly includes a housing. The balancer assembly further includes a first balance shaft rotatably supported by the housing for rotation about a first longitudinal axis. A second balance shaft is rotatably supported by the housing for rotation about a second longitudinal axis. The first balance shaft includes a first counterweight portion and a second counterweight portion axially spaced from the first counterweight portion along the first longitudinal axis. The second balance shaft includes a central counterweight disposed axially between the first counterweight portion and the second counterweight portion relative to the first longitudinal axis.

Accordingly, the arrangement between the first balance shaft and the second balance shaft allows the first counterweight portion and the second counterweight portion of the first balance shaft to radially overlap the central counterweight of the second balance shaft, thereby allowing a lateral spacing between the first balance shaft and the second balance shaft to be decreased. A radius of the drive gear and the driven gear is reduced by decreasing the lateral spacing between the first balance shaft and the second balance shaft. Reducing the radius of the drive gear and the driven gear reduces the inertia of the first balance shaft and the second balance shaft, which reduces gear rattle of the balancer assembly when the engine is at idle.

The above features and advantages and other features and advantages of the present invention are readily apparent from the following detailed description of the best modes for carrying out the invention when taken in connection with the accompanying drawings.

DETAILED DESCRIPTION

Figure 1:
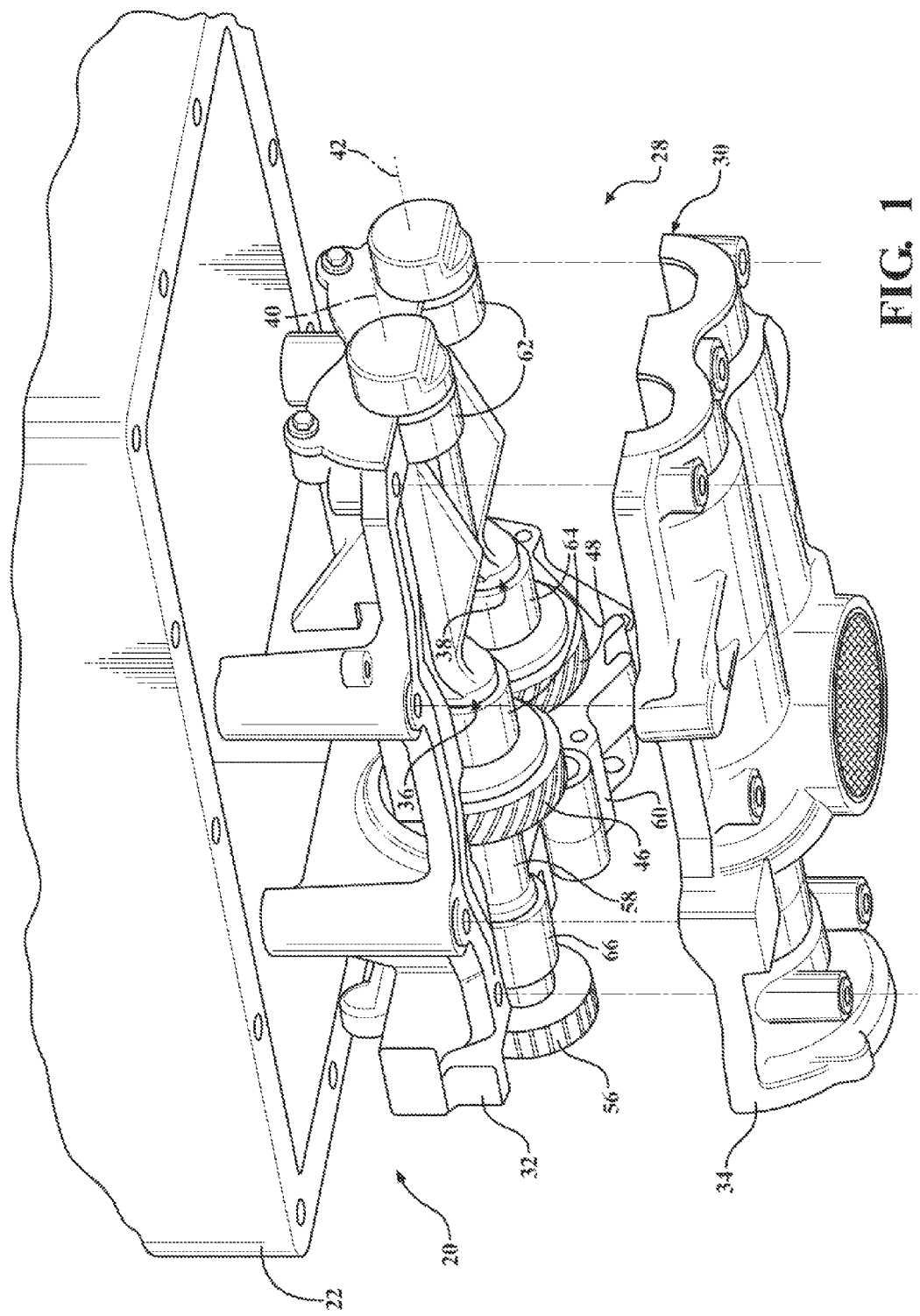
FIG. 1 is a schematic fragmentary exploded perspective view of an engine showing a balancer assembly.
Figure 2:
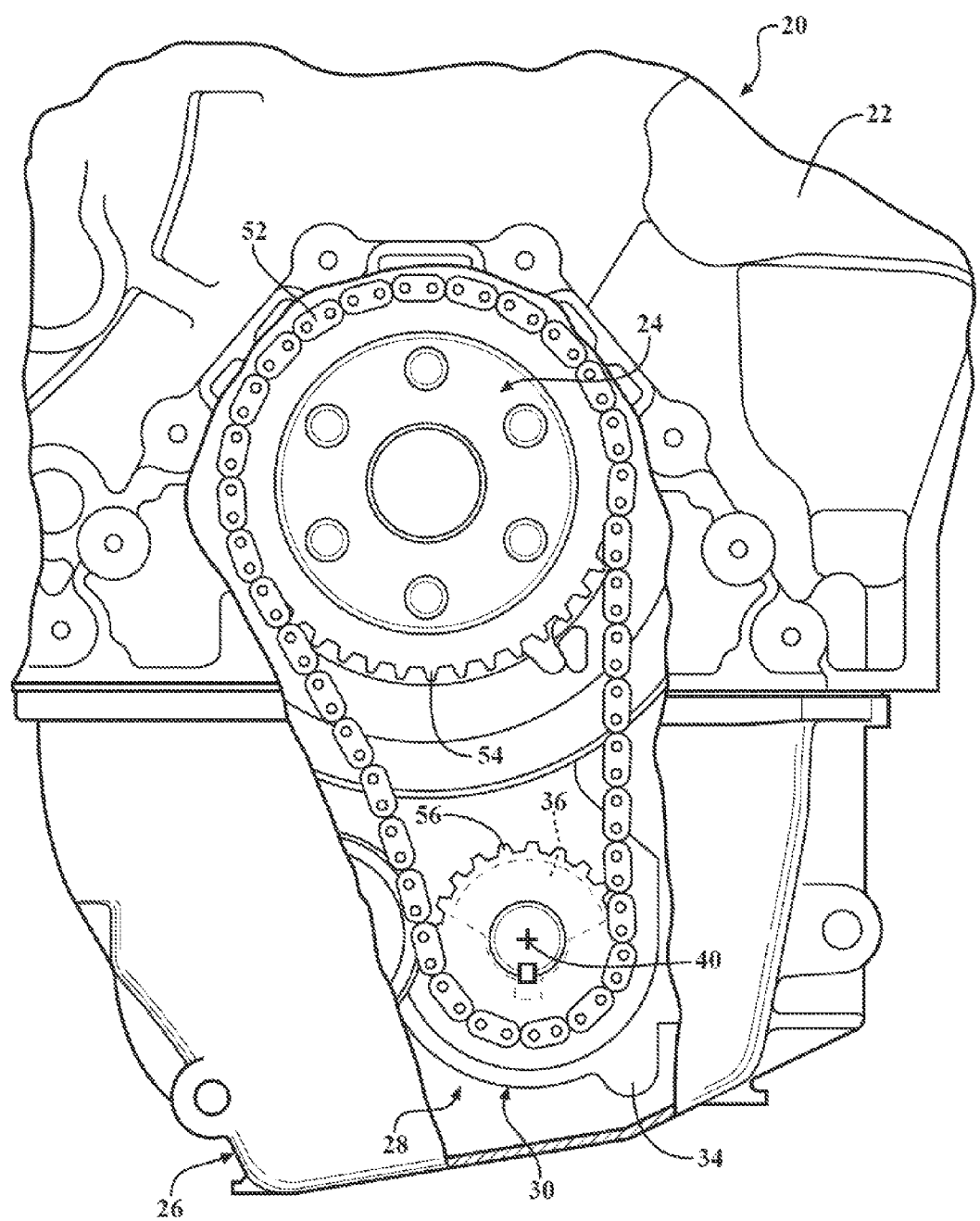
FIG. 2 is a schematic fragmentary front plan view of the engine.

Referring to the Figures, wherein like numerals indicate like parts throughout the several views, an engine is shown generally at 20. The engine 20 may include, but is not limited to, a four stroke four cylinder in-line engine 20. Referring to FIGS. 1 and 2, the engine 20 includes a block 22 having a plurality of cylinders (not shown) and a plurality of pistons (not shown). A crankshaft 24 is rotatably supported by the block 22 in a crankcase portion of the block 22. An oil pan 26 is mounted to the block 22, and seals the underside of the crankcase portion. A plurality of connecting rods (not shown) connects the crankshaft 24 with the pistons. During operation of the engine 20, reciprocation of the pistons generates a second order vibration unbalance in the form of a vertical shaking force cycling at twice a crankshaft speed.

The engine 20 includes a balancer assembly 28 for balancing the secondary vibration. The balancer assembly 28 includes a housing 30. As shown, the housing 30 may include an first section 32 and a second section 34, with the first section 32 and the second section 34 being split generally horizontally to form the housing 30. A plurality of fasteners (not shown) attach the first section 32 and the second section 34 together, and also attach the housing 30 to the block 22 at a lower portion of the crankcase, below the crankshaft 24. However, it should be appreciated that the housing 30 may be configured and attached to the block 22 in some other manner not shown or described herein.

The housing 30 rotatably supports a first balance shaft 36 and a second balance shaft 38. The first balance shaft 36 is rotatable relative to the housing 30 about a first longitudinal axis 40. The second balance shaft 38 is rotatable relative to the housing 30 about a second longitudinal axis 42. The first longitudinal axis 40 and the second longitudinal axis 42 are parallel with each other and laterally spaced from each other a lateral distance 44.

Figure 3:
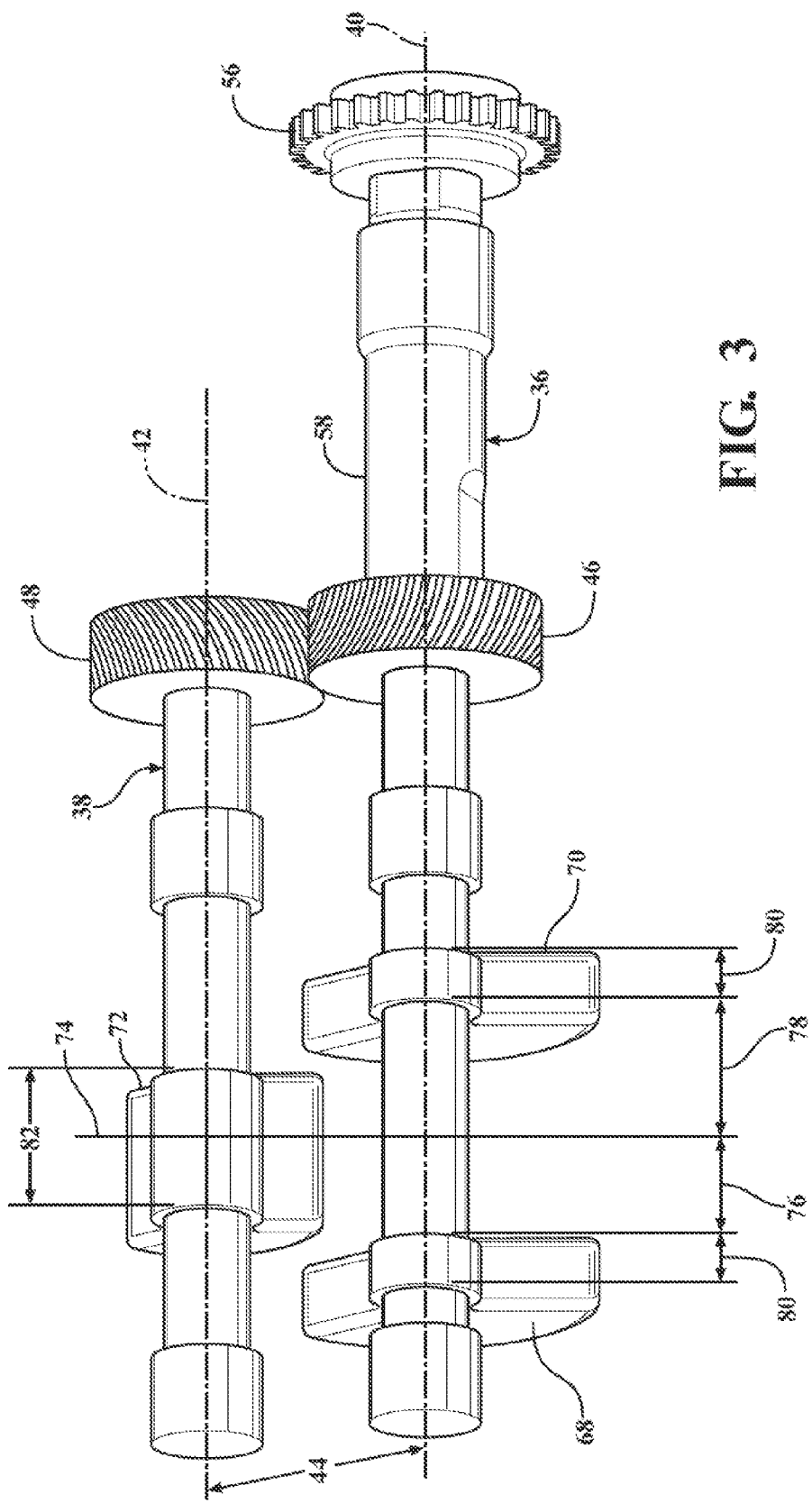
FIG. 3 is a schematic top perspective view of a first balance shaft and a second balance shaft of the balancer assembly.
Figure 4:
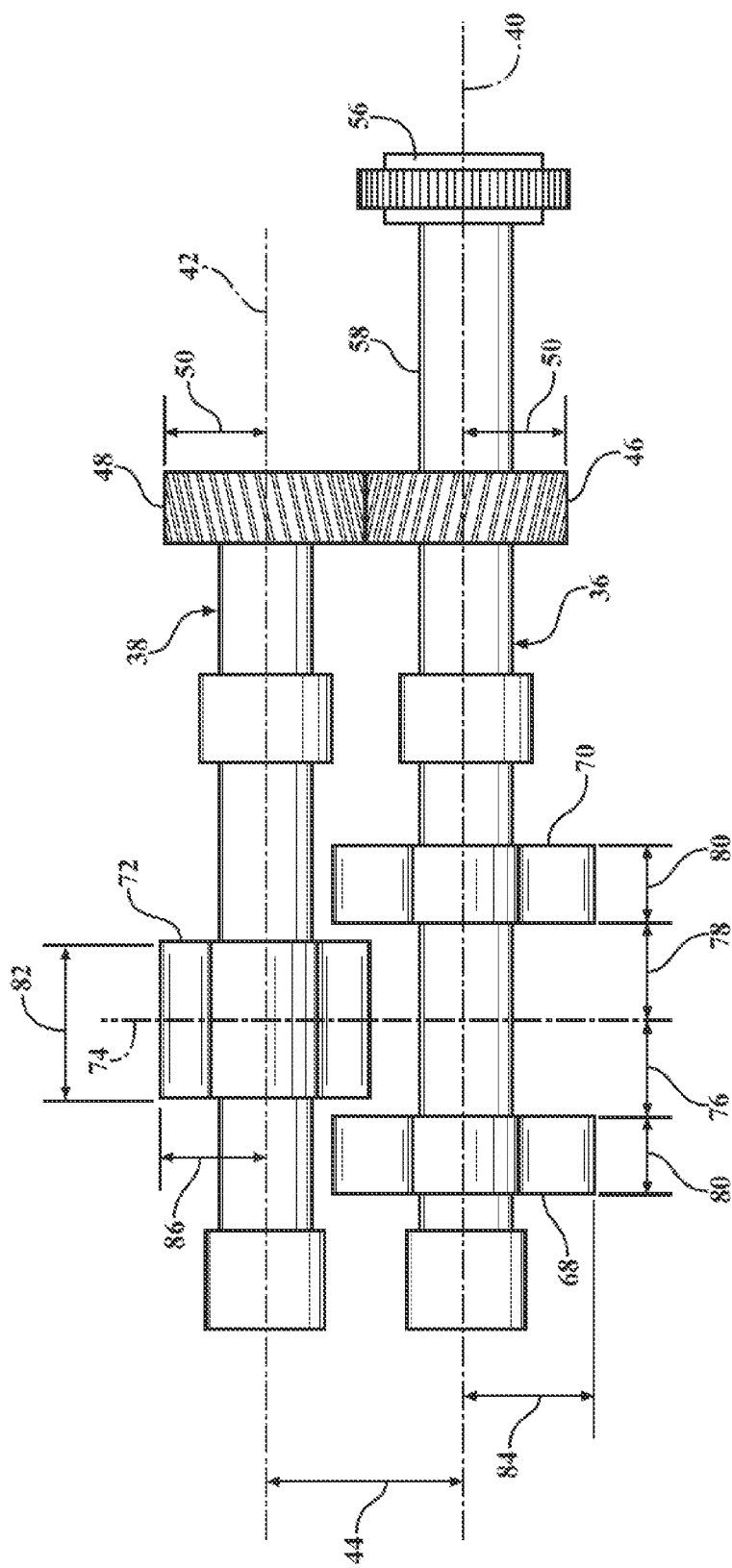
FIG. 4 is a schematic top plan view of the first balance shaft and the second balance shaft.

Referring also to FIGS. 3 and 4, the first balance shaft 36 includes a drive gear 46, and the second balance shaft 38 includes a driven gear 48. The drive gear 46 and the driven gear 48 are identical in size and gear ratio, with each defining a gear radius 50, i.e., the gear radius 50 of the drive gear 46 is equal to the gear radius 50 of the driven gear 48. The drive gear 46 is in meshing engagement with the driven gear 48.

The first balance shaft 36 is coupled to and driven by the crankshaft 24. As best shown in FIG. 2, a chain 52 connects a drive sprocket 54 disposed on the crankshaft 24 with a driven sprocket 56 mounted to an extension 58 on the first balance shaft 36. The drive gear 46 and the driven gear 48 connect the first balance shaft 36 and the second balance shaft 38 for timed equal and opposite rotation. Accordingly, rotation of the crankshaft 24 rotates the first balance shaft 36, and thereby the drive gear 46, at twice the crankshaft speed. The meshing engagement between the drive gear 46 and the driven gear 48 likewise rotates the driven gear 48, and thereby the second balance shaft 38, at twice the crankshaft speed. The second balance shaft 38 rotates in an opposite direction relative to the first balance shaft 36.

An oil pump 60 may be mounted to the housing 30. The second balance shaft 38 may be coupled to and drive the oil pump 60 to power the oil pump 60. Each of the first balance shaft 36 and the second balance shaft 38 are supported by a forward bearing 62 and a rearward bearing 64. The first balance shaft 36 is further supported by a drive bearing 66 disposed near the driven sprocket 56.

Referring to FIGS. 3 and 4, the first balance shaft 36 includes a first counterweight portion 68 and a second counterweight portion 70. The second counterweight portion 70 is axially spaced from the first counterweight portion 68 along the first longitudinal axis 40. The second balance shaft 38 includes a central counterweight 72. The central counterweight 72 is disposed axially between the first counterweight portion 68 and the second counterweight portion 70 relative to the first longitudinal axis 40. In other words, the first counterweight portion 68 of the first balance shaft 36 is disposed forward of the central counterweight 72 of the second balance shaft 38 relative to the first longitudinal axis 40 and the second longitudinal axis 42, and the second counterweight portion 70 of the first balance shaft 36 is disposed rearward of the central counterweight 72 of the second balance shaft 38, relative to the first longitudinal axis 40 and the second longitudinal axis 42. As such, the first counterweight portion 68 is axially offset forward along the first longitudinal axis 40 from an axial center 74 of the central counterweight 72 a first offset distance 76, and the second counterweight portion 70 is axially offset rearward along the first longitudinal axis 40 from the axial center 74 of the central counterweight 72 a second offset distance 78. The second offset distance 78 extends in a direction along the first longitudinal axis 40 opposite the first offset distance 76. The first offset distance 76 may be equal to the second offset distance 78.

The first counterweight portion 68 and the second counterweight portion 70 each extend a first length 80 along the first longitudinal axis 40. The central counterweight 72 extends a second length 82 along the first longitudinal axis 40. The second length 82 is greater than the first length 80.

Figure 5:
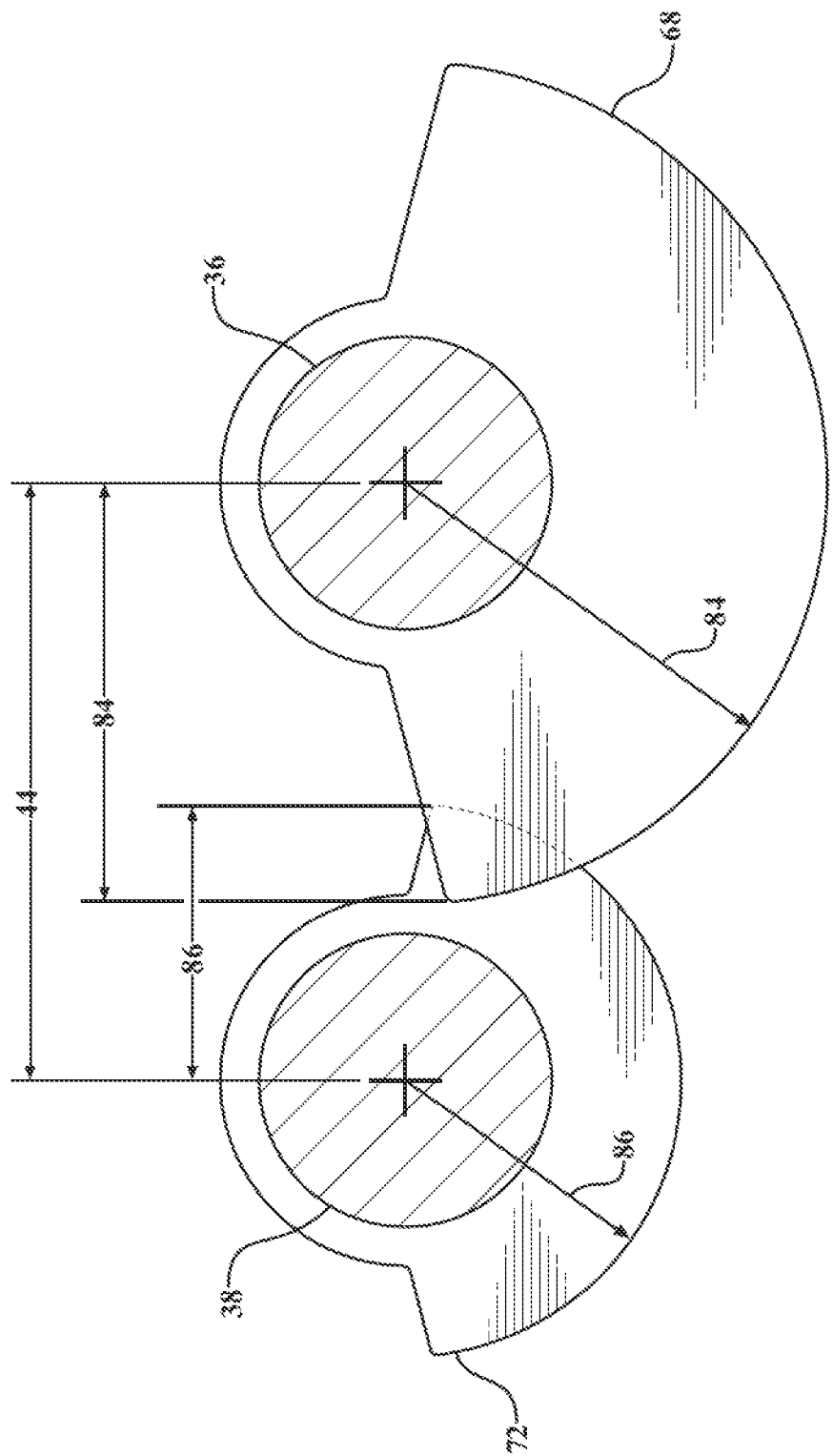
FIG. 5 is a schematic end view of the first balance shaft and the second balance shaft.

Referring also to FIG. 5, the first counterweight portion 68 and the second counterweight portion 70 each define a first radius 84 extending radially outward from the first longitudinal axis 40. The central counterweight 72 defines a second radius 86 extending radially outward from the second longitudinal axis 42. The first radius 84 is greater than the second radius 86. As described above, the first longitudinal axis 40 is parallel with the second longitudinal axis 42 and laterally spaced from the second longitudinal axis 42 a lateral distance 44. The lateral distance 44 is less than the sum of the first radius 84 and the second radius 86, and the lateral distance 44 is greater than the first radius 84. The lateral distance 44, the first radius 84 and the second radius 86 may vary depending upon specific design requirements of the engine 20. However, the lateral distance 44 may equal but is not limited to 42.0 mm, the first radius 84 may equal but is not limited to 31.5 mm, and the second radius 86 may equal but is not limited to 21.0 mm.

Because the radially overlapping arrangement between the first counterweight portion 68 and the second counterweight portion 70 of the first balance shaft 36 with the central counterweight 72 of the second balance shaft 38, the radial size of the drive gear 46 and the driven gear 48 relative to the first longitudinal axis 40 and the second longitudinal axis 42 respectively may be reduced. Reducing the radial size of the drive gear 46 and the driven gear 48 reduces the inertia of the first balance shaft 36 and the second balance shaft 38, which reduces gear rattle. Additionally, the radially overlapping arrangement between the first counterweight portion 68 and the second counterweight portion 70 of the first balance shaft 36 with the central counterweight 72 of the second balance shaft 38 allows the lateral distance 44 between the first balance shaft 36 and the second balance shaft 38 to be reduced, which reduces the packaging requirements of the balancer assembly 28.

As described above, each of the drive gear 46 and the driven gear 48 define a gear radius 50, with the gear radius 50 of the drive gear 46 equal to the gear radius 50 of the driven gear 48. The gear radius 50 of the drive gear 46 and the driven gear 48 is less than the first radius 84. Additionally, twice the gear radius 50 is less than the sum of the first radius 84 and the second radius 86.

While the best modes for carrying out the invention have been described in detail, those familiar with the art to which this invention relates will recognize various alternative designs and embodiments for practicing the invention within the scope of the appended claims.

The invention claimed is:

1. An engine comprising:
   a block
   a crankshaft rotatably supported by the block;
   a balancer assembly attached to the block and configured for balancing vibrations of the engine, the balancer assembly including:
   a housing;
   a first balance shaft rotatably supported by the housing for rotation about a first longitudinal axis and coupled to and driven by the crankshaft, the first balance shaft having a drive gear; and
   a second balance shaft rotatably supported by the housing for rotation about a second longitudinal axis and having a driven gear in meshing engagement with the drive gear;
   wherein the first balance shaft includes a first counterweight portion and a second counterweight portion axially spaced from the first counterweight portion along the first longitudinal axis, and the second balance shaft includes a central counterweight disposed axially between the first counterweight portion and the second counterweight portion relative to the first longitudinal axis; and wherein the first counterweight portion and the second counterweight portion each define a first radius extending radially outward from the first longitudinal axis and the central counterweight defines a second radius extending radially outward from the second longitudinal axis, wherein the first radius is greater than the second radius.

2. An engine as set forth in claim 1 wherein the first longitudinal axis is parallel with the second longitudinal axis and laterally spaced from the second longitudinal axis a lateral distance.

3. An engine as set forth in claim 2 wherein the lateral distance is less than the sum of the first radius and the second radius.

4. An engine as set forth in claim 3 wherein the lateral distance is greater than the first radius.

5. An engine as set forth in claim 2 wherein the lateral distance is equal to 42.0 mm, the first radius is equal to 31.5 mm, and the second radius is equal to 21.0 mm.

6. An engine as set forth in claim 1 wherein the drive gear and the driven gear each define a gear radius, and wherein twice the gear radius is less than the sum of the first radius and the second radius.

7. An engine as set forth in claim 1 wherein the drive gear and the driven gear each define a gear radius, and wherein the gear radius is less than the first radius.

8. An engine as set forth in claim 1 wherein the first counterweight portion and the second counterweight portion each extend a first length along the first longitudinal axis, and the central counterweight extends a second length along the first longitudinal axis, wherein the second length is greater than the first length.

9. An engine as set forth in claim 8 wherein the first counterweight portion is axially offset along the first longitudinal axis from an axial center of the central counterweight a first offset distance and the second counterweight portion is axially offset along the first longitudinal axis from the axial center of the central counterweight a second offset distance extending in a direction along the first longitudinal axis opposite the first offset distance.

10. An engine as set forth in claim 9 wherein the first offset distance is equal to the second offset distance.

11. A balancer assembly for an engine, the balancer assembly comprising:
a housing;
a first balance shaft rotatably supported by the housing for rotation about a first longitudinal axis; and
a second balance shaft rotatably supported by the housing for rotation about a second longitudinal axis;
wherein the first balance shaft includes a first counterweight portion and a second counterweight portion axially spaced from the first counterweight portion along the first longitudinal axis, and the second balance shaft includes a central counterweight disposed axially between the first counterweight portion and the second counterweight portion relative to the first longitudinal axis; and
wherein the first counterweight portion and the second counterweight portion each define a first radius extending radially outward from the first longitudinal axis and the central counterweight defines a second radius extending radially outward from the second longitudinal axis, wherein the first radius is greater than the second radius.

12. A balancer assembly as set forth in claim 11 wherein the first counterweight portion and the second counterweight portion each extend a first length along the first longitudinal axis, and the central counterweight extends a second length along the first longitudinal axis, wherein the second length is greater than the first length.

13. A balancer assembly as set forth in claim 12 wherein the first counterweight portion is axially offset along the first longitudinal axis from an axial center of the central counterweight a first offset distance and the second counterweight portion is axially offset along the first longitudinal axis from the axial center of the central counterweight a second offset distance extending in a direction along the first longitudinal axis opposite the first offset distance.

14. A balancer assembly as set forth in claim 13 wherein the first offset distance is equal to the second offset distance.

15. A balancer assembly as set forth in claim 11 wherein the first longitudinal axis is parallel with the second longitudinal axis and laterally spaced from the second longitudinal axis a lateral distance.

16. A balancer assembly as set forth in claim 15 wherein the lateral distance is less than the sum of the first radius and the second radius.

17. A balancer assembly as set forth in claim 16 wherein the lateral distance is greater than the first radius.

18. A balancer assembly as set forth in claim 11 wherein the first balance shaft includes a drive gear and the second balance shaft includes a driven gear, with each of the drive gear and the driven gear defining a gear radius, wherein the gear radius is less than the first radius, and twice the gear radius is less than the sum of the first radius and the second radius.

* * * * *